United States Patent [19]

Moseley

[11] Patent Number: 4,566,191
[45] Date of Patent: Jan. 28, 1986

[54] X-Y POSITION INDICATOR FOR A DISPLAY SYSTEM

[75] Inventor: John B. Moseley, Norfolk, Conn.

[73] Assignee: The Torrington Company, Torrington, Conn.

[21] Appl. No.: 601,566

[22] Filed: Apr. 18, 1984

[51] Int. Cl.[4] ............................................. G01B 7/02
[52] U.S. Cl. .................................. 33/1 M; 33/141 R; 33/141.5
[58] Field of Search ................. 33/141, 142, 141.5, 33/1 M, 32 B, 32 C, 18 R; 340/710; 250/231 R

[56] References Cited

U.S. PATENT DOCUMENTS 3,613,090 10/1971 Mason .................................. 33/1 M
3,892,963 7/1975 Hawley et al. ...................... 33/1 M
4,246,703 1/1981 Robinet .............................. 33/141 R Primary Examiner—Willis Little
Attorney, Agent, or Firm—Frank S. Troidl

[57] ABSTRACT

An X-Y position indicator control for manual movement over any surface to move a cursor over the display on a cathode ray tube, the indicator control generating signals indicating its position to cause a cursor to be displayed on the tube at the corresponding position. The indicator control mechanism contains X-Y position wheels mounted with their axes in perpendicular planes, which rotate according to the X and Y movements of the mechanism. As the position indicator control is moved along a surface each position wheel is resiliently urged into contact with the surface.

5 Claims, 3 Drawing Figures

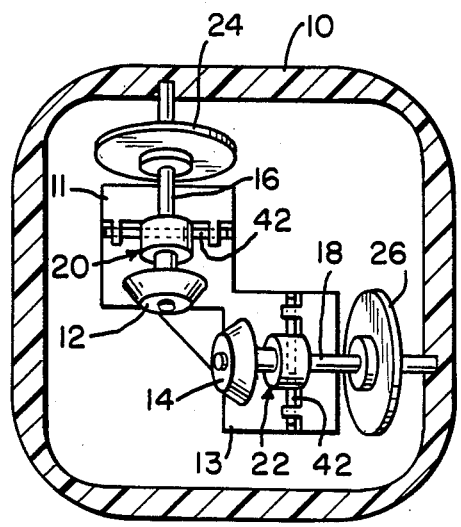
FIG. 1
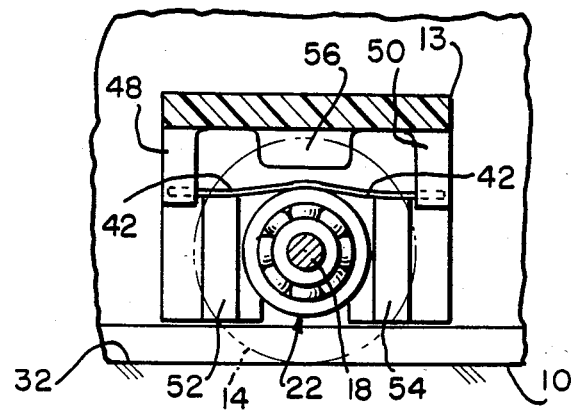
FIG. 3
FIG. 2
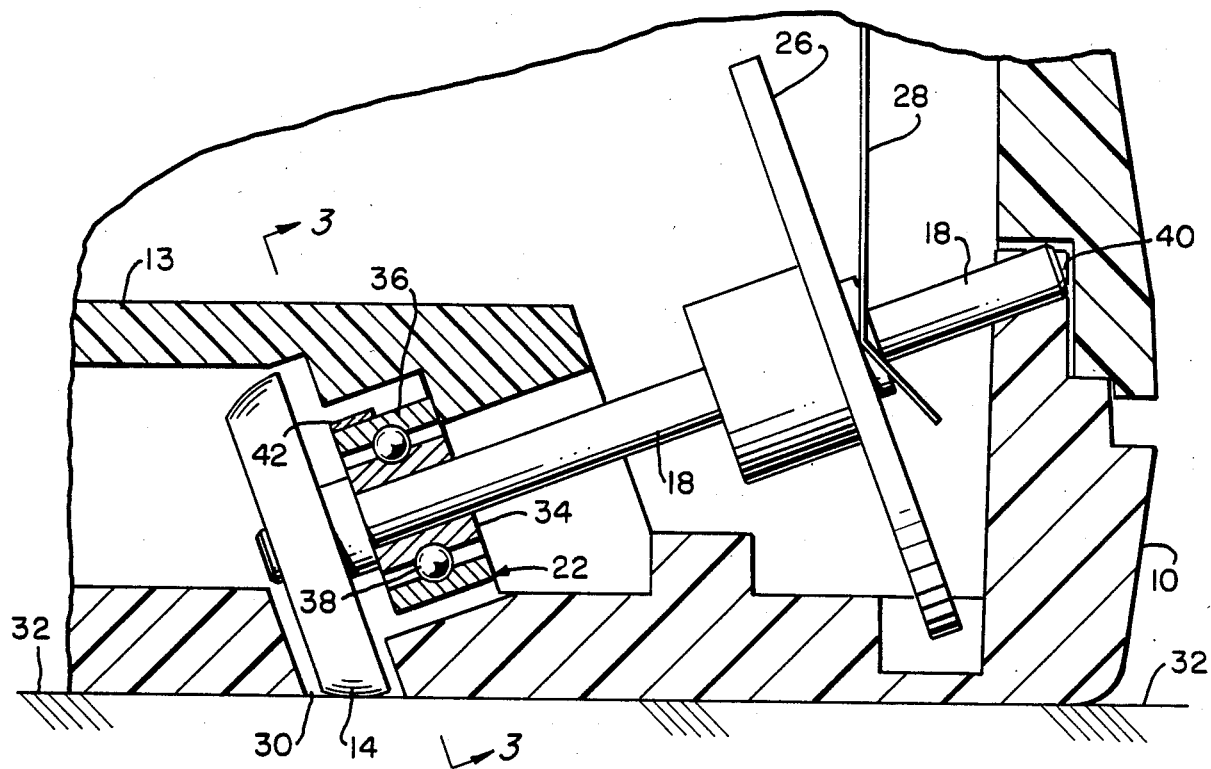

X-Y POSITION INDICATOR FOR A DISPLAY SYSTEM

This invention relates to visual display systems and more particularly to devices for altering the display at selected locations.

U.S. Pat. No. 3,541,541 to Engelbart teaches such a device with various transducer elements for converting positional movement of a device to positional signals for utilization by a display device. U.S. Pat. No. 3,892,963 to Hawley et al. teaches the use of a transducer element for generating positional signals indicative of the respective rotation of the indicator wheels. One problem with the position wheels contained in the Engelbart U.S. Pat. No. 3,541,541 device and the Hawley et al. U.S. Pat. No. 3,892,963 device is that in each device the position wheels are rigidly attached to the position wheel supports. Thus, if the supporting surface upon which the position wheels rotate should not be perfectly flat, the wheels will lose contact with the supporting surface and an inaccurate display will occur on the cathode ray tube.

In this invention the disadvantage of the prior art is eliminated. The structure of the X-Y position indicator of this invention is such that the position wheels will remain in contact with the supporting surface even though the supporting surface may have some scratches or other defects which cause the position indicator to move over a supporting surface which is not perfectly flat.

Briefly described, the position indicator is a device for use with a system for electronically representing the positional movement of the position indicator over a surface. The indicator includes a first position wheel and a second position wheel both rotatably mounted in a housing. The axes of the position wheels are in perpendicular planes. A mechanical-to-electrical transducer is actuated by the rotation of each of the position wheels for generating electric signals indicating the amount of rotation of the wheels. Biasing means, such as a spring, is mounted on the housing and resiliently urges each of the wheels into contact with the supporting surface.

The invention as well as its many advantages will be further understood by reference to the following detailed description and drawings in which:

FIG. 1 is a bottom view, partly in section, of a preferred embodiment of the invention;

FIG. 2 is a side sectional view, on an enlarged scale, of the preferred embodiment of FIG. 1; and FIG. 3 is a view on a smaller scale than the scale of FIG. 2 taken along lines 3—3 of FIG. 2 and in the direction of the arrows.

In the various figures like parts are referred to by like numbers.

Referring to the drawings and more particularly to FIG. 1, the new position indicator includes a housing 10 in which is mounted a position indicating support including an X-position indicator support 11 and a Y-position indicator support 13. A first rotatable position wheel 12 and a second rotatable position wheel 14 are mounted in X-position indicator support 11 and Y-position indicator support 13, respectively. The axes of the position wheels 12 and 14 are in perpendicular planes.

Position wheels 12 and 14 are rotatable on position wheel shafts 16 and 18, respectively. The shafts 16 and 18 rotate within anti-friction bearings 20 and 22, respectively.

A mechanical-to-electrical transducer is actuated by the rotation of each of the position wheels 12 and 14. The transducer means includes an encoding wheel 24 attached to shaft 16 and an encoding wheel 26 attached to shaft 18. Wire contacts, such as wire contact 28 (see FIG. 2) which are attached (not shown) to the housing contact the encoding wheel 26 (a similar wire, not shown, contacts the encoding wheel 24). As the wheels 12 and/or 14 rotate the shafts 16 and 18 rotate within the bearings 20 and 22 thus causing the encoder wheels 24 and 26 to rotate to generate X and Y coordinate information which is sent to the computer.

FIG. 2 and FIG. 3 show in more detail than FIG. 1, the structure of position indicator support 13. Position indicator support 11 is constructed in the same manner as position indicator support 13.

Referring to FIG. 2, it can be seen that the position wheel 14 extends through a slot 30 provided in the bottom of the housing 10. The rim portion of the position wheel 14 which extends past the bottom of the housing is adapted to roll along the surface 32. This surface may be, for example, a desk top or wall of a spacecraft.

The anti-friction bearing 22 includes an inner race 34 which is mounted about the shaft 18 and rotates with the shaft 18. The anti-friction bearing 22 also includes an outer race 36. Balls 38 rotate within the annular grooves provided in inner race 34 and outer race 36. The outer race 36 is kept fixed against rotation while the shaft 18 and inner race 34 rotate within the outer race 36.

The outer end of the rotatable shaft 18 is loosely restrained by the pocket 40 provided in the side wall of the housing 10 at a point spaced upwardly from the bottom of the housing whereby the rotatable shaft 18 is inclined with respect to the bottom of the housing.

Biasing means mounted in the housing resiliently urge each of the wheels through the slots in the bottom of the housing and into contact with the surface 32. In the preferred embodiment shown, the biasing means includes a leaf spring 42 which presses downwardly on the outer race 36 of bearing 22 so that the position wheel 14 is urged downwardly. Of course, the position wheel 14 is also urged downwardly into contact with the surface 32. The spring 42 is sized so that the weight of the position device and operator's hand will easily overcome its force. Thus if the position device is placed on the flat surface 32, the position wheels 12 and 14 are pushed upwards. With this arrangement the position wheels will always remain in firm contact with the surface 32 even if the surface 32 is not completely flat. Also the generation of frictional force of sufficient magnitude between the wheels and surface to enable the wheels to rotate the encoder assembly reliably as the position device is moved is insured.

As seen more particularly in FIG. 3, the leaf spring 42 has its ends fitted in grooves formed in the lower surfaces of a pair of downwardly extending protrusions 48 and 50. The ball bearing 22 separates a pair of upwardly extending leaf spring supports 52 and 54. Upwardly extending supports 52 and 54 are closer to the bearing 22 than the downwardly extending protrusions 48 and 50. The tops of the upwardly extending supports 52 and 54 support the bottom of the leaf spring 42. The downwardly extending stop 56 limits the upward movement of the position wheel assembly.

In operation the coordinate information is generated as the position indicator is moved form one position to a second position along the surface 32. If the position indicator is moved vertically along surface 32, one of the position indicator wheels 12 and 14 will rotate while the other does not rotate. If the position indicator is moved horizontally along the surface 32, the other wheel rotates while the first wheel does not rotate. If the position indicator is moved from a first position to a second position which is not along a vertical or horizontal line as the move takes place each wheel will both slide and rotate and the distance of rotation of each wheel supplies the X-Y coordinate information required to tell the computer that the position indicator has moved from the first point to the second point.

I claim:

1. A position indicator device for use with a system for electronically representing the positional movement of said position indicator device over a surface comprising: a housing adapted to be moved along said surface; a first position wheel rotatably mounted in said housing; a second position wheel rotatably mounted in said housing; the axes of said first position wheel and said second position wheel being in perpendicular planes; each position wheel being mounted on a separate rotatable shaft adjacent one end of said shaft, said shaft being loosely mounted in a wall of said housing axially spaced from said wheel and spaced upwardly from the bottom of the housing; mechanical-to-electrical tranducers means actuated by rotation of each of said first position wheel and said second position wheel for generating electric signals indicating the amount of rotation of each of said wheels; and bias means mounted in said housing and resiliently urging each of said wheels toward said surface, said housing being constructed to permit a rim portion of each wheel to extend past the bottom of said housing into contact with the surface.

2. A position indicator device in accordance with claim 1 wherein: the bias means comprises a pair of springs, one spring for each wheel.

3. A position indicator device in accordance with claim 2 wherein: each spring is a leaf spring.

4. A position indicator device in accordance with claim 1, wherein the rotatable shaft is inclined with respect to the bottom of the housing.

5. A position indicator device in accordance with claim 4 wherein: each rotatable shaft is carried by an anti-friction bearing, and the bias means are a pair of springs, one spring in contact with the outside of each anti-friction bearing.

* * * * *